United States Patent
Zia et al.

(10) Patent No.: US 11,117,454 B2
(45) Date of Patent: Sep. 14, 2021

(54) SEAL COMPONENT FOR VEHICLE DOOR WINDOW

(71) Applicant: TOYODA GOSEI CO., LTD., Kiyosu (JP)

(72) Inventors: Kashif Zia, Troy, MI (US); Kentaro Adachi, Troy, MI (US); Ruben Vazquez, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 197 days.

(21) Appl. No.: 16/394,035

(22) Filed: Apr. 25, 2019

(65) Prior Publication Data

US 2020/0338972 A1    Oct. 29, 2020

(51) Int. Cl.
*B60J 10/70* (2016.01)
*B60J 10/18* (2016.01)
*B60J 1/10* (2006.01)
*B60J 1/12* (2006.01)

(52) U.S. Cl.
CPC .............. *B60J 10/70* (2016.02); *B60J 10/18* (2016.02); *B60J 1/10* (2013.01); *B60J 1/12* (2013.01)

(58) Field of Classification Search
None
See application file for complete search history.

(56) References Cited

U.S. PATENT DOCUMENTS

| | | | | |
|---|---|---|---|---|
| 4,649,668 A * | 3/1987 | Skillen | .................. | B60J 10/265 49/374 |
| 4,800,681 A * | 1/1989 | Skillen | .................... | B60J 10/78 49/440 |
| 5,261,721 A * | 11/1993 | Conger | ..................... | B60J 1/14 296/146.15 |
| 5,557,890 A * | 9/1996 | Levy | ........................ | B60J 10/78 49/502 |
| 5,702,148 A * | 12/1997 | Vaughan | ................ | B60J 10/235 296/146.9 |
| 5,846,463 A * | 12/1998 | Keeney | ...................... | B60J 1/08 264/135 |
| 6,250,017 B1 * | 6/2001 | Tessier | ..................... | B60J 10/78 49/440 |

(Continued)

FOREIGN PATENT DOCUMENTS

| | | | | |
|---|---|---|---|---|
| FR | 2604766 A1 * | 4/1988 | ............. | B60J 10/30 |
| JP | 2001071752 A * | 3/2001 | ............. | B60J 10/78 |

(Continued)

*Primary Examiner* — Marcus Menezes
(74) *Attorney, Agent, or Firm* — Posz Law Group, PLC (57) ABSTRACT

A seal component includes a division bar arranged between the movable glass and the fixed glass, a flexible first seal molded integrally with the division bar and sealing both a vertical side portion of the movable glass and a vertical side portion of the fixed glass, a flexible second seal coupled to an upper end of the first seal and sealing a portion of a periphery of the fixed glass excluding the vertical side portion, and a coupling member that couples a lower side portion of the second seal to the first seal. The first seal includes a first groove into which the vertical side portion of the fixed glass is fitted thereby sealing the vertical side portion, and the second seal includes a second groove into which the portion of the periphery of the fixed glass excluding the vertical side portion is fitted thereby sealing the fitted portion.

7 Claims, 6 Drawing Sheets

(56) References Cited

U.S. PATENT DOCUMENTS

| | | | |
|---|---|---|---|
| 6,663,165 B2 * | 12/2003 | Naito | B60J 5/0402 |
| | | | 219/428 |
| 7,854,094 B2 * | 12/2010 | Zimmer | B60J 10/50 |
| | | | 49/440 |
| 8,328,975 B2 * | 12/2012 | Ruppert | B60J 10/18 |
| | | | 156/245 |
| 10,315,349 B2 * | 6/2019 | Krueger | B29C 48/0021 |
| 2002/0003356 A1 * | 1/2002 | Davis | B60J 10/76 |
| | | | 296/146.16 |
| 2003/0205918 A1 * | 11/2003 | Carvalho | B60J 10/75 |
| | | | 296/203.03 |
| 2010/0001550 A1 * | 1/2010 | Janisch | B60J 10/78 |
| | | | 296/146.2 |
| 2019/0077230 A1 * | 3/2019 | Tallent | B60J 10/79 |
| 2020/0298690 A1 * | 9/2020 | Yu | B60J 10/20 |

FOREIGN PATENT DOCUMENTS

| | | | | |
|---|---|---|---|---|
| JP | 2003-260937 A | | 9/2003 | |
| JP | 2007276686 A | * | 10/2007 | B60J 10/30 |

* cited by examiner

SEAL COMPONENT FOR VEHICLE DOOR WINDOW

BACKGROUND

The following description relates to a seal component for a vehicle door window.

A window of a rear door of a vehicle includes a door glass that can be raised and lowered relative to a door frame and a quarter glass that is fixed to the door frame. Further, the window includes a seal component that seals the gap between the door frame, the door glass, and the quarter glass (for example, refer to Japanese Laid-Open Patent Publication No. 2003-260937).

The seal component of the publication includes an upper bar, a glass seal, and a glass run. The upper bar is arranged between the door glass and the quarter glass and forms the upper part of a division bar. The glass seal seals the gap between the quarter glass and the door frame. The glass run seals the gap between the door glass and the door frame. The glass seal and the glass run are molded integrally with the upper bar.

In the seal component described in the publication, the glass seal is formed separately from the quarter glass and practically cannot be coupled to the periphery of the quarter glass. Accordingly, the quarter glass is inserted into a mold and molded integrally with the glass seal. However, in this case, the injection pressure of resin may crack the fixed glass.

SUMMARY

It is an objective of the present disclosure to provide a seal component for a vehicle door window that allows the seal component formed separately from a fixed glass to be readily coupled to the fixed glass.

In one general aspect, a seal component for a vehicle door window seals a gap between a door frame, a movable glass that can be raised and lowered relative to the door frame, and a fixed glass fixed to the door frame. The seal component includes a division bar, a flexible first seal, a flexible second seal, and a coupling member. The division bar is arranged between the movable glass and the fixed glass. The first seal is molded integrally with the division bar and seals both a vertical side portion of the movable glass and a vertical side portion of the fixed glass. The second seal is coupled to an upper end of the first seal and seals a portion of a periphery of the fixed glass excluding the vertical side portion. The coupling member couples a lower side portion of the second seal to the first seal. The first seal includes a first groove into which the vertical side portion of the fixed glass is fitted thereby sealing the vertical side portion. The second seal includes a second groove into which the portion of the periphery of the fixed glass excluding the vertical side portion is fitted thereby sealing the fitted portion.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings.

DETAILED DESCRIPTION

A first embodiment will now be described with reference to FIGS. 1 to 7C. Hereinafter, a front-rear direction refers to the front-rear direction of a vehicle, and a front side and a rear side respectively refer to the front side and the rear side in the front-rear direction. Further, an outer side and an inner side respectively refer to the outer side and the inner side in a vehicle transverse direction.

Figure 1:
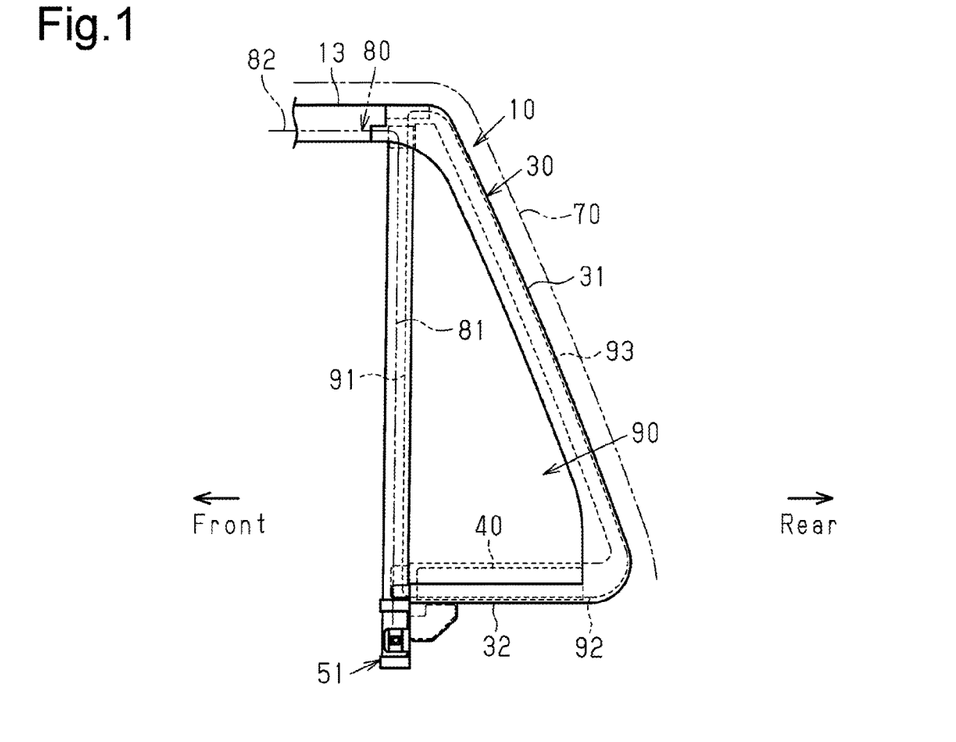
FIG. 1 is a side view taken from an inside of a vehicle showing a seal component for a vehicle door window in accordance with a first embodiment in a state in which a fixed glass is coupled.

As shown in FIG. 1, a seal component 10 seals gaps between a door frame 70 of a rear door of an automobile, a movable glass 80 that can be raised and lowered relative to the door frame 70, and a triangular fixed glass 90 fixed to the door frame 70. The fixed glass 90 is a quarter glass.

Figure 7A:
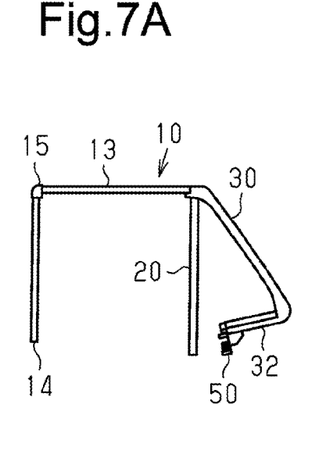
FIGS. 7A, 7B, and 7C are side views illustrating the procedure for coupling the fixed glass to the seal component in the first embodiment.
Figure 7B:
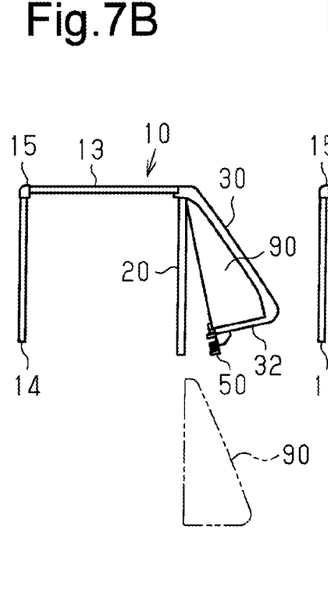
Figure 7C:
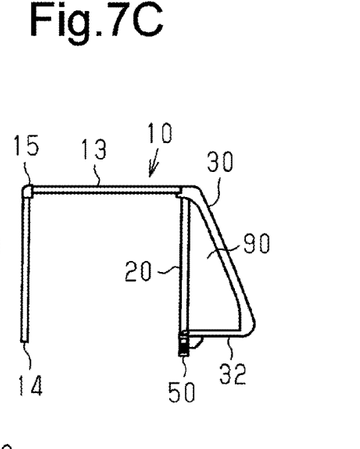
Figure 8:
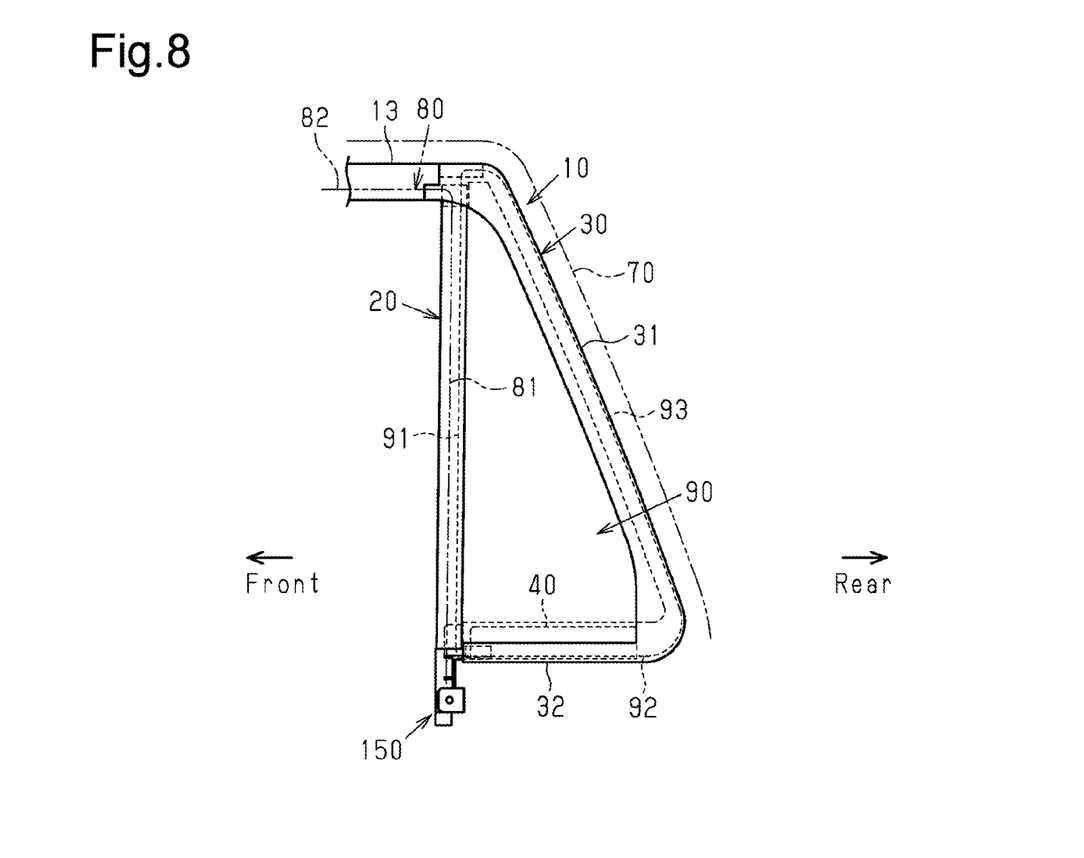
FIG. 8 is a side view taken from the inside of the vehicle showing a seal component in accordance with a second embodiment in a state in which a fixed glass is coupled.

The seal component 10 includes a first seal 20, a second seal 30, a third seal 13, and a fourth seal 14 (refer to FIGS. 7A to 7C).

The first seal 20 extends between the movable glass 80 and the fixed glass 90 in a vertical direction. The movable glass 80 includes a vertical side portion 81 at the rear side, and the fixed glass 90 includes a vertical side portion 91. The first seal 20 seals both the vertical side portion 81 of the movable glass 80 and the vertical side portion 91 of the fixed glass 90.

The second seal 30 includes a diagonal side portion 31 and a lower side portion 32 and is substantially L-shaped. The diagonal side portion 31 is coupled to an upper end of the first seal 20 and extends diagonally so as to be lower toward the rear. The lower side portion 32 extends forward from a lower end of the diagonal side portion 31. The periphery of the fixed glass 90 includes a diagonal side portion 93 and a horizontal side portion 92. The diagonal side portion 31 and the lower side portion 32 seal the diagonal side portion 93 and the horizontal side portion 92 of the fixed glass 90, respectively. That is, the second seal 30 seals the portions 92 and 93 but not the vertical side portion 91 in the periphery of the fixed glass 90.

The third seal 13 is coupled to the upper end of the first seal 20 and extends forward. The third seal 13 seals a gap between the door frame 70 and an upper side portion 82 of the movable glass 80.

The fourth seal 14 is coupled to an upper end of the third seal 13 by a coupling part 15 and extends downward. The fourth seal 14 seals a gap between the door frame 70 and a vertical side portion (not shown) of the movable glass 80 at the front side.

The first seal 20, the second seal 30, the third seal 13, and the fourth seal 14 are each formed from a flexible material. In the first embodiment, a dynamically crosslinked thermoplastic elastomer is used as the flexible material (e.g. thermoplastic vulcanizate (TPV)). The flexible material is not limited to TPV and may be a rubber material, for example, soft polyvinyl chloride (soft PVC). Alternatively, the flexible material may be a rubber, for example, ethylene-propylene-diene monomer rubber (EPDM). Preferably, the flexible material is TPV or EPDM.

The second seal 30 is formed by injecting resin into a mold in a state in which the upper end of the preformed first seal 20 is inserted into the mold. This couples the upper end of the second seal 30 to the upper end of the first seal 20.

In the present embodiment, as described above, the first seal 20 and the second seal 30 are formed from the same flexible material. This couples the upper end of the first seal 20 and the upper end of the second seal 30 more firmly than when the first seal 20 and the second seal 30 are formed from different flexible materials. Accordingly, for example, when one of the first seal 20 and the second seal 30 is formed from soft PVC, it is preferred that the other one also be formed from the soft PVC. Further, if one of the first seal 20 and the second seal 30 is formed from EPDM, it is preferred that the other one also be formed from EPDM.

The seal component 10 includes a coupling member 50 that couples the lower side portion 32 of the second seal 30 and the first seal 20.

The first seal 20 will now be described in detail.

Figure 3:
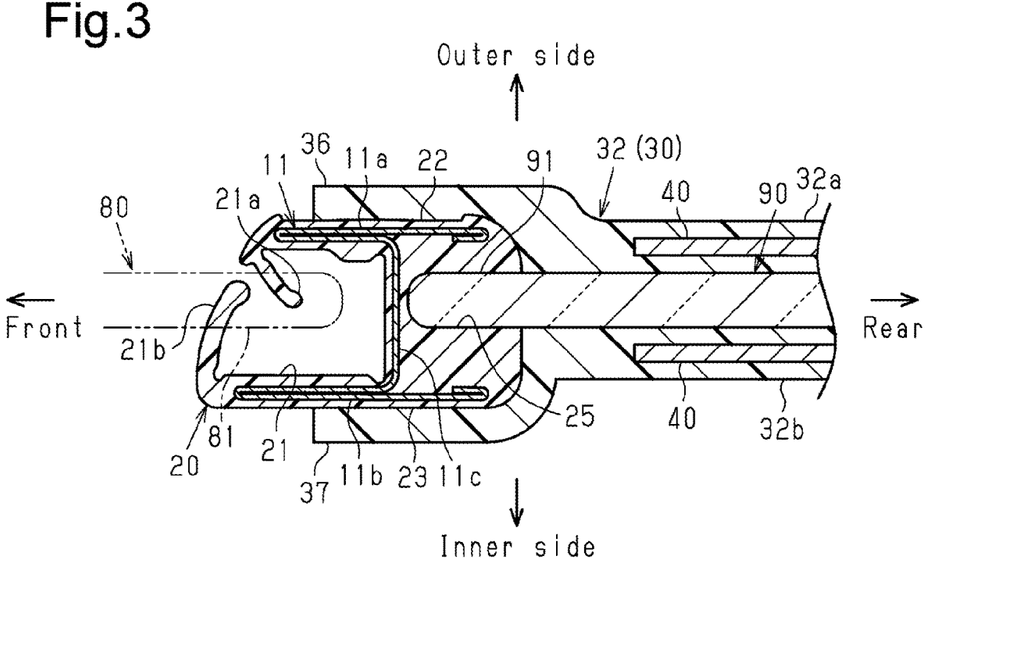
FIG. 3 is a cross-sectional view taken along line A3-A3 in FIG. 2.

As shown in FIG. 3, the first seal 20 includes a first groove 25 formed in a rear surface and extending in the vertical direction. The vertical side portion 91 of the fixed glass 90 is fitted into the first groove 25. This seals the gap between the first seal 20 and the vertical side portion 91.

Figure 4:
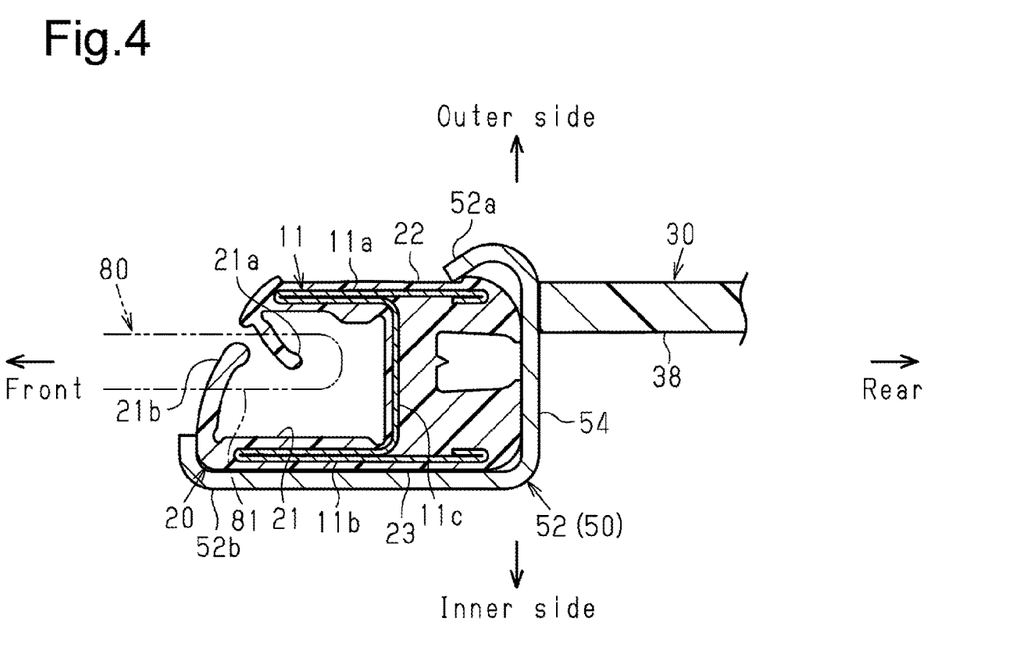
FIG. 4 is a cross-sectional view taken along line A4-A4 in FIG. 2.

As shown in FIGS. 3 and 4, the first seal 20 has a front surface including a seal groove 21 extending in the vertical direction. The vertical side portion 81 of the movable glass 80 is fitted into the seal groove 21. An outer lip 21a and an inner lip 21b are arranged at the front edges of the seal groove 21. When the vertical side portion 81 is fitted into the seal groove 21, the lips 21a and 21b are pressed against an outer surface and an inner surface of the movable glass 80 in an elastically deformed state. This seals the gap between the first seal 20 and the vertical side portion 81.

The first seal 20 is molded integrally with a division bar 11 extending in the vertical direction between the movable glass 80 and the fixed glass 90. That is, the first seal 20 is molded by injecting resin into a mold in a state in which the division bar 11 is inserted into the mold.

The division bar 11 includes an outer portion 11a, an inner portion 11b, and a connecting portion 11c that connects the outer portion 11a and the inner portion 11b. The division bar 11 has an H-shaped cross section and is formed by bending a thin metal sheet.

The outer portion 11a is located in the first seal 20 outward from the first groove 25 and the seal groove 21. The inner portion 11b is located in the first seal 20 inward from the first groove 25 and the seal groove 21. The connecting portion 11c is located in the first seal 20 between the first groove 25 and the seal groove 21.

The second seal 30 will now be described in detail.

Figure 2:
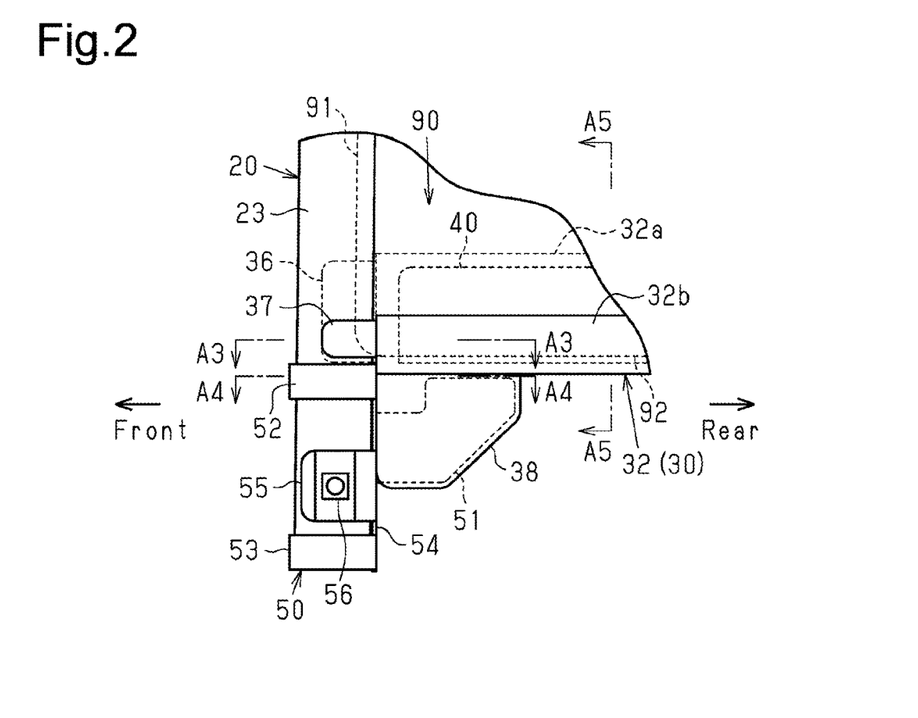
FIG. 2 is a partially enlarged side view of FIG. 1.
Figure 5:
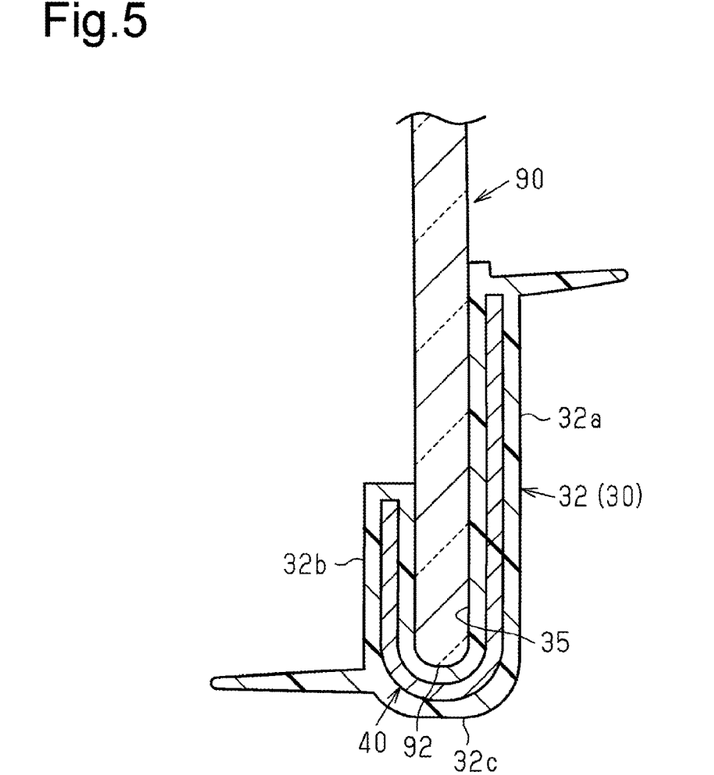
FIG. 5 is a cross-sectional view taken along line A5-A5 in FIG. 2.

As shown in FIGS. 2 and 5, the lower side portion 32 of the second seal 30 includes an outer wall 32a, an inner wall 32b, and a connecting portion 32c that connects a lower end of the outer wall 32a and a lower end of the inner wall 32b. The lower side portion 32 has a substantially U-shaped cross section. The upper edge of the outer wall 32a is located upward from the upper edge of the inner wall 32b.

A resin member 40 that is formed from a hard resin material is formed integrally with the lower side portion 32. The resin member 40 has a substantially U-shaped cross section conforming to the cross-sectional shape of the lower side portion 32 and extends in a direction in which the lower side portion 32 extends. That is, the second seal 30 is formed by injecting resin into a mold in a state in which the resin member 40 is inserted in the mold.

As shown in FIG. 5, the resin member 40 is located inside each one of the outer wall 32a, the inner wall 32b, and the connecting portion 32c. In the first embodiment, polypropylene is used as a hard resin. The hard resin material is not limited to polypropylene, and may be, for example, nylon or polyester.

When a rubber such as EPDM, which is required to be heated for vulcanization, is used as the flexible material forming the second seal 30, nylon or polyester will be preferred. This is because nylon and polyester have a melting point that is much higher than the vulcanization temperature and thus do not melt or deform during the vulcanization.

In contrast, when TPV is used as the flexible material forming the second seal 30 like in the present embodiment, the second seal 30 will be molded at a lower temperature than the vulcanization temperature. Thus, polypropylene having a melting point lower than that of nylon or polyester can be used. Particularly, polypropylene is less expensive than nylon and polyester. This reduces the manufacturing cost.

The outer wall 32a, the inner wall 32b, and the connecting portion 32c form a second groove 35 that extends in the front-rear direction.

The horizontal side portion 92 of the fixed glass 90 is fitted into the second groove 35. This seals the gap between the second seal 30 and the horizontal side portion 92.

As shown in FIG. 1, the diagonal side portion 31 of the second seal 30 includes an outer wall (not shown), an inner wall (not shown), and a connecting portion (not shown) that are respectively shaped in correspondence with the outer wall 32a, the inner wall 32b, and the connecting portion 32c of the lower side portion 32. The outer wall, the inner wall, and the connecting wall form a second groove (not shown) that extends in a direction in which the diagonal side portion 31 extends in the same manner as the second groove 35.

The diagonal side portion 93 of the fixed glass 90 is fitted in the second groove. This seals the gap between the second seal 30 and the diagonal side portion 93.

As shown in FIGS. 2 and 3, the lower side portion 32 includes an outer support 36 and an inner support 37. The outer support 36 and the inner support 37 respectively support an outer side surface 22 and an inner side surface 23 of the first seal 20 in a thickness-wise direction of the fixed glass 90.

An adhesive (not shown) is arranged between the pair of supports 36 and 37 and the two side surfaces 22 and 23 of the first seal 20.

As shown in FIG. 2, the second seal 30 includes a flat extension 38 that extends downward from a front part of the lower side portion 32, more specifically, from a front part of the outer wall 32a.

The coupling member 50 will now be described in detail.

Figure 6:
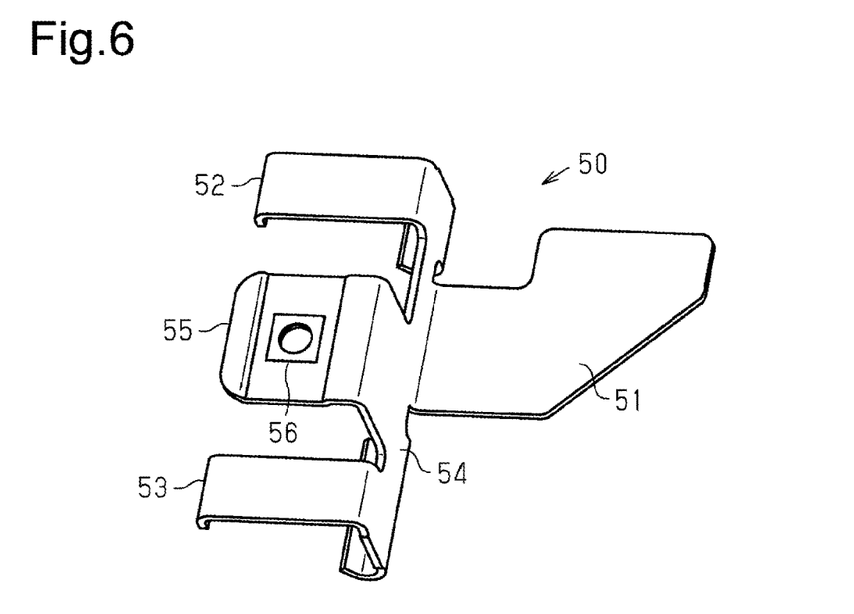
FIG. 6 is a perspective view of a coupling member in accordance with the first embodiment.

As shown in FIGS. 2, 4, and 6, the coupling member 50 includes a base 54 and an insert 51. The base 54 extends in the vertical direction and contacts the rear surface of the first seal 20. The insert 51 is formed integrally with the extension 38 and extends rearward from the base 54. That is, the second seal 30 is formed by injecting resin into a mold in a state in which the insert 51 of the coupling member 50 is inserted in the mold.

An upper engagement portion 52 and a lower engagement portion 53 extend toward the front and are respectively arranged at an upper part and a lower part of the base 54. The upper engagement portion 52 and the lower engagement portion 53 are swaged to be engaged with the first seal 20. The upper engagement portion 52 and the lower engagement portion 53 each sandwich the outer side surface 22 and the inner side surface 23 of the first seal 20.

A fastener 55 is arranged on the base 54 at a section between the engagement portions 52 and 53 The fastener 55 extends toward the front and fastens the seal component 10 to an inner panel (not shown) of the rear door. The fastener 55 includes a nut 56 for fastening the seal component 10.

The coupling member 50 is formed, for example, by bending a metal plate.

A process for coupling the fixed glass 90 to the seal component 10 will now be described with reference to FIGS. 7A to 7C.

First, the upper end of the second seal 30 is bent to separate the lower side portion 32 of the second seal 30 from the first seal 20 and form a gap between the first seal 20 and the lower side portion 32 (refer to FIG. 7A).

In this state, the gap is used to fit the periphery of the fixed glass 90 into the second groove 35 of the second seal 30 (refer to FIG. 7B).

Subsequently, the lower side portion 32 of the second seal 30 is moved toward the first seal 20 to fit the vertical side portion 91 of the fixed glass 90 into the first groove 25 of the first seal 20 (refer to FIG. 7C).

Finally, the upper engagement portion 52 and the lower engagement portion 53 of the coupling member 50 are swaged to couple the lower side portion 32 of the second seal 30 to the first seal 20.

The present embodiment has the following advantages.

($_1$) Through the process described above, the fixed glass 90 is readily coupled to the seal component 10, which is formed separately from the fixed glass 90.

(2) The first seal 20 and the second seal 30 are formed separately from the fixed glass 90. This avoids situations in which the fixed glass is cracked when integrally molding the second seal 30 and the fixed glass 90.

(3) The first seal 20 seals both the vertical side portion 81 of the movable glass 80 and the vertical side portion 91 of the fixed glass 90. This allows the first seal 20 to have a smooth surface, which differs from a structure in which a seal that seals the vertical side portion 81 of the movable glass 80 and a seal that seals the vertical side portion 91 of the fixed glass 90 are formed separately and then coupled together to be integrated with each other. Thus, the aesthetic appeal of the seal component 10 can be improved. Further, the smooth surface of the first seal 20 reduces wind noise.

(4) The insert 51 is formed integrally with the lower side portion 32 to couple the coupling member 50 to the lower side portion 32. This firmly couples the coupling member 50 to the lower side portion 32.

Further, the coupling member 50 is readily coupled to the lower side portion 32 by inserting part of the coupling member 50 into a mold when forming the second seal 30. That is, the required steps and cost for manufacturing the seal component 10 are reduced compared to when the coupling member 50 is coupled to the lower side portion 32 by inserting part of the coupling member 50 into the second seal 30 after the second seal 30 is molded.

(5) The engagement portions 52 and 53 are swaged to couple the coupling member 50 to the first seal 20. This firmly couples the coupling member 50 to the first seal 20.

(6) The resin member 40 increases the rigidity of the lower side portion 32. This restricts deformation of the lower side portion 32 when fitting the fixed glass 90 into the second groove 35 of the second seal 30. This facilitates the coupling of the fixed glass 90 to the second seal 30. Further, deformation of the lower side portion 32 after the coupling is also restricted.

Particularly, the second seal 30 is molded with the resin member 40 inserted into a mold. This reduces the required steps and cost for manufacturing the seal component 10 compared to when the resin member 40 is coupled to the second seal 30 by inserting the resin member 40 into the second seal 30 after the second seal 30 is molded.

(7) The adhesive firmly couples the lower side portion 32 to the first seal 20.

(8) The two supports 36 and 37 support the lower side portion 32 on the first seal 20 from both the outer side and the inner side. Further, the supports 36 and 37 readily provide an adhesive area. This firmly couples the lower side portion 32 to the first seal 20.

Second Embodiment

With reference to FIGS. 8 to 12, a second embodiment will now be described with focusing on differences from the first embodiment. The same reference numerals are given to those components that are the same as the corresponding components of the first embodiment. Such components will not be described.

As shown in FIGS. 8 to 10, and 12, a coupling member 150 includes a base 154 and an insert 151. The base 154 extends in the vertical direction and contacts the inner side surface 23 of the first seal 20. The insert 151 extends rearward from the base 154 and is formed integrally with the inner wall 32b.

Figure 10:
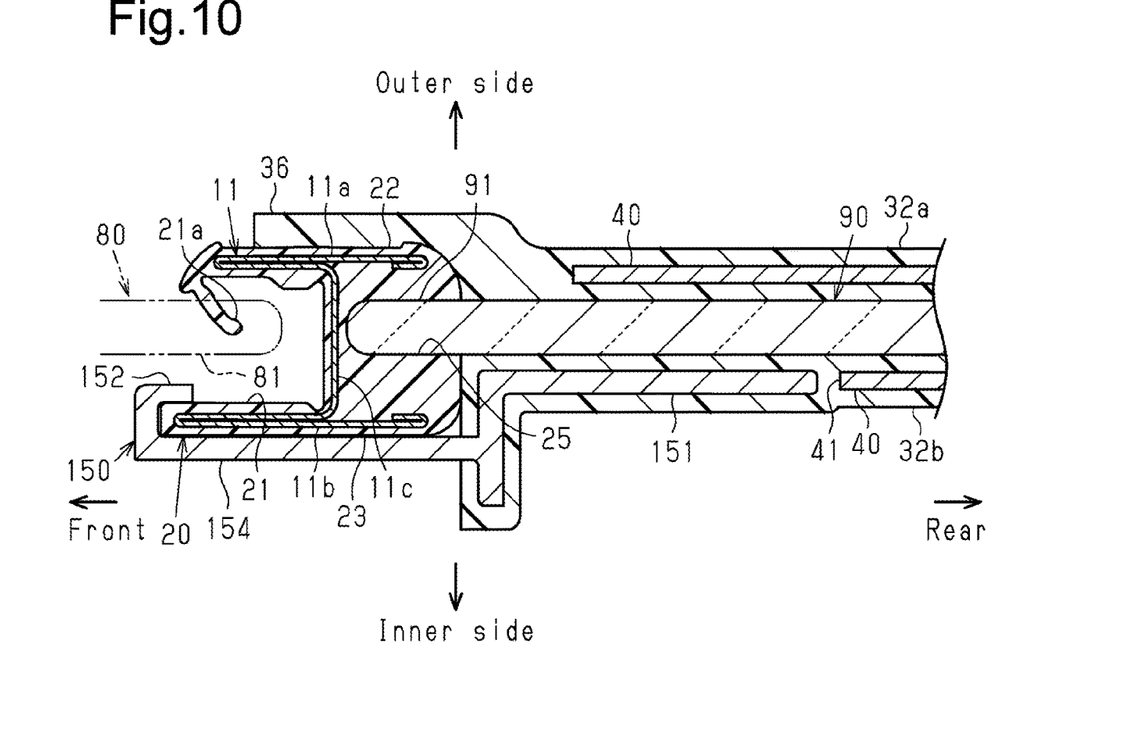
FIG. 10 is a cross-sectional view taken along line B10-B10 in FIG. 9.

As shown in FIG. 10, a front portion of the resin member 40 includes a cutout 41. The cutout 41 is formed at a portion corresponding to the inner wall 32b of the lower side portion 32. That is, the front part of the inner wall 32b includes a portion where the resin member 40 does not exist.

The second seal 30 includes only the outer support 36 and does not include the inner support 37.

The insert 151 is arranged inside the portion of the inner wall 32b where the resin member 40 does not exist because of the cutout 41. In the present embodiment, the extension 38 of the second seal 30 is omitted.

An upper portion of the base 154 includes a first engagement portion 152 that is snap-fitted to engage with an inner edge of the seal groove 21.

Figure 11:
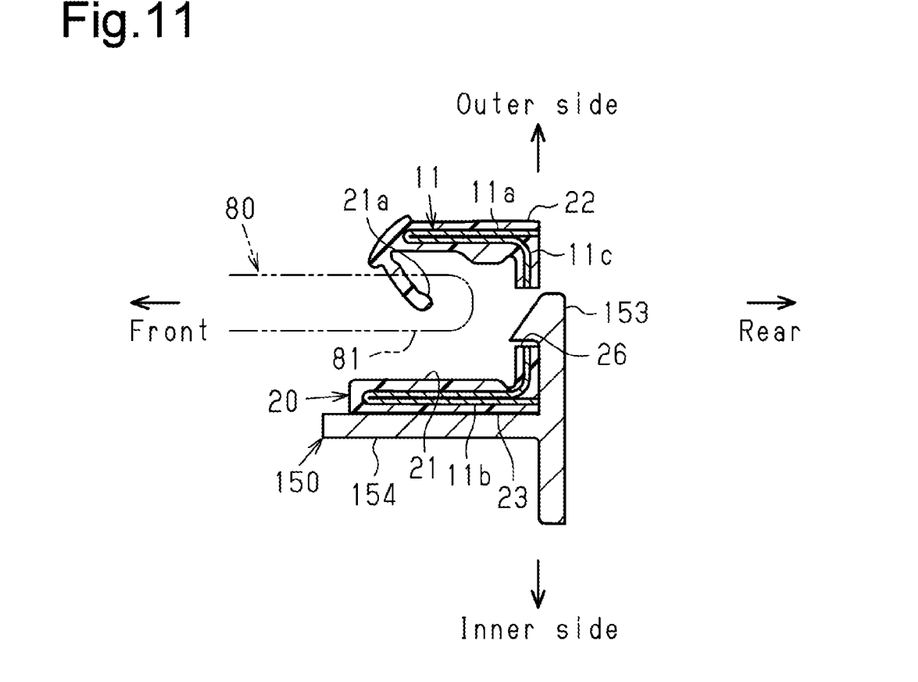
FIG. 11 is a cross-sectional view taken along line B11-B11 in FIG. 9.
Figure 12:
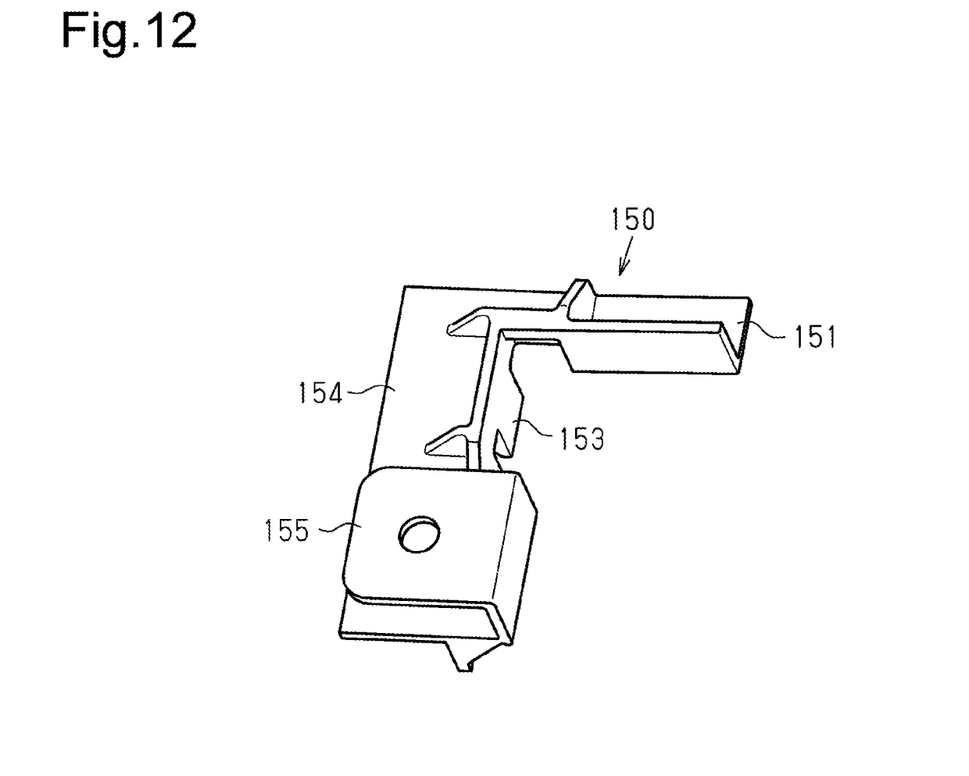
FIG. 12 is a perspective view of a coupling member in accordance with the second embodiment.

As shown in FIGS. 11 and 12, the upper portion of the base 154 includes a second engagement portion 153 that is snap-fitted to and engaged with an engagement hole 26. The engagement hole 26 connects the seal groove 21 of the first seal 20 and the rear of the first seal 20.

Figure 9:
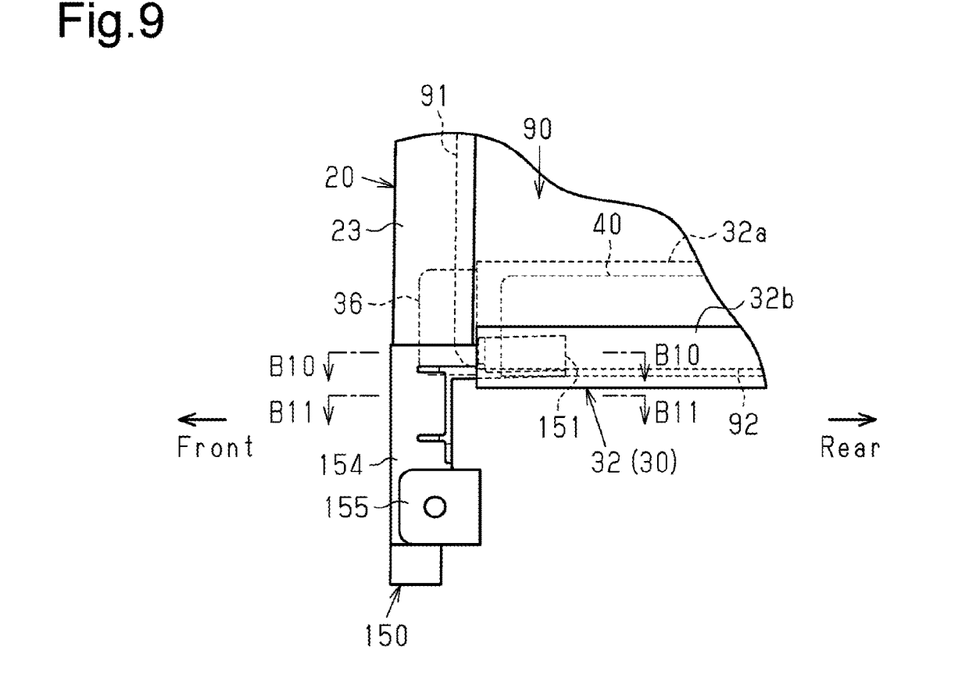
FIG. 9 is a partially enlarged side view of FIG. 8.

As shown in FIGS. 9 and 12, a lower portion of the base 154 includes a fastener 155 that fastens the seal component 10 to the inner panel (not shown) of the rear door.

The coupling member 150 is formed from, for example, a hard resin.

The present embodiment has the following advantages.

The present embodiment obtains advantages described below in addition to advantages (1) to (4), (6), and (7) of the first embodiment.

(9) The engagement portions 152 and 153 of the coupling member 150 are snap-fitted to couple the coupling member 150 to the first seal 20. Thus, the coupling member 150 is readily coupled to the first seal 20 without using any tools.

(10) The outer support 36 and the first engagement portion 152 support the lower side portion 32 on the first seal 20 from both the outer side and the inner side. Further, the outer support 36 readily provides an adhesive area. This firmly couples the lower side portion 32 to the first seal 20.

MODIFIED EXAMPLES

The seal component for a vehicle door window in the present description is not limited to the structure exemplified in the above embodiments and may be embodied as described below.

Part of the first seal 20, the second seal 30, the third seal 13, and the fourth seal 14 may be formed from a flexible material differing from that of the other portions.

The first seal 20, the second seal 30, the third seal 13, and the fourth seal 14 may all be formed from different materials.

The first seal 20 may be formed separately from the second seal 30, and the upper end of the first seal 20 may be coupled to the upper end of the second seal 30 by a separate member. For example, a member that couples the first seal 20 to the second seal 30 may be molded by injecting resin into a mold in a state in which the upper end of the first seal 20 and the upper end of the second seal 30 are inserted in the mold.

In the first embodiment, the adhesive, which is arranged between the supports 36 and 37 and the side surfaces 22 and 23 of the first seal 20, may be omitted.

In the second embodiment, the adhesive, which is arranged between the outer support 36 and the outer side surface 22 of the first seal 20, may be omitted.

The resin member 40 may have any shape. For example, the resin member may be a flat plate. In this case, the resin member is inserted into only one of the outer wall 32a and the inner wall 32b.

In the second embodiment, the resin member 40 may be molded integrally with the coupling member 150.

The resin member 40 may be coupled to the second seal 30 by inserting the resin member 40 into the second seal 30 after the second seal 30 is molded.

The resin member 40 may be omitted.

The inserts 51 and 151 of the coupling members 50 and 150 may be omitted, and the coupling members 50 and 150 may be fixed to the lower side portion 32 of the second seal 30 by an adhesive.

The first seal and the second seal may be molded integrally at the same time.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. The scope of the disclosure is not defined by the detailed description, but by the claims and their equivalents. All variations within the scope of the claims and their equivalents are included in the disclosure. The disclosure is not to be limited to the details given herein, but may be modified within the scope and equivalence of the appended claims.

What is claimed is:

1. A seal component for a vehicle door window that seals a gap between a door frame, a movable glass that can be raised and lowered relative to the door frame, and a fixed glass fixed to the door frame, the seal component comprising:
    a division bar arranged between the movable glass and the fixed glass;
    a flexible first seal molded integrally with the division bar and sealing both a vertical side portion of the movable glass and a vertical side portion of the fixed glass;
    a flexible second seal coupled to an upper end of the first seal and sealing a portion of a periphery of the fixed glass excluding the vertical side portion of the fixed glass; and
    a coupling member that couples a lower side portion of the second seal to the first seal, wherein
    the first seal includes a first groove into which the vertical side portion of the fixed glass is fitted thereby sealing the vertical side portion of the fixed glass, and
    the second seal includes a second groove into which the portion of the periphery of the fixed glass excluding the vertical side portion of the fixed glass is fitted and thereby sealed.

2. The seal component for the vehicle door window according to claim 1, wherein the coupling member includes an insert formed integrally with the lower side portion.

3. The seal component for the vehicle door window according to claim 1, wherein the coupling member includes an engagement portion that is swaged to be engaged with the first seal.

4. The seal component for the vehicle door window according to claim 1, wherein the coupling member includes an engagement portion that is snap-fitted to be engaged with the first seal.

5. The seal component for the vehicle door window according to claim 1, wherein the lower side portion is formed integrally with a resin member formed from a hard resin material.

6. The seal component for the vehicle door window according to claim 1, wherein the lower side portion is adhered to the first seal.

7. The seal component for the vehicle door window according to claim 6, wherein the lower side portion includes a support that supports a side surface of the first seal in a thickness-wise direction of the fixed glass, and the support is adhered to the side surface of the first seal.

* * * * *